(12) United States Patent
Sales

(10) Patent No.: US 12,631,801 B2
(45) Date of Patent: May 19, 2026

(54) REFLECTIVE AND REFRACTIVE DIFFUSER

(71) Applicant: VIAVI SOLUTIONS INC., Chandler, AZ (US)

(72) Inventor: Tasso R. M. Sales, Rochester, NY (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 622 days.

(21) Appl. No.: 18/072,101

(22) Filed: Nov. 30, 2022

(65) Prior Publication Data

US 2024/0176052 A1 May 30, 2024

(51) Int. Cl.
*G02B 5/02* (2006.01)

(52) U.S. Cl.
CPC ............. *G02B 5/0236* (2013.01); *G02B 5/02* (2013.01); *G02B 5/0284* (2013.01)

(58) Field of Classification Search
CPC .......... G02B 5/00; G02B 5/02; G02B 5/0205; G02B 5/021; G02B 5/0215; G02B 5/0221; G02B 5/0226; G02B 5/0231; G02B 5/0247; G02B 5/0268; G02B 5/0273; G02B 5/0289; G02B 5/04; G02B 5/045; G02B 5/08; G02B 5/0808; G02B 5/0816; G02B 5/085
USPC ........................................................ 359/599
See application file for complete search history.

(56) References Cited

U.S. PATENT DOCUMENTS

| | | | | |
|---|---|---|---|---|
| 5,361,163 | A | * | 11/1994 | Matsuda ................. G03B 21/60 |
| | | | | 359/452 |
| 6,724,529 | B2 | * | 4/2004 | Sinkoff ................. G03B 21/60 |
| | | | | 359/449 |

| | | | | |
|---|---|---|---|---|
| 7,324,276 | B2 | * | 1/2008 | Wood ................... G02B 17/002 |
| | | | | 359/449 |
| 7,736,046 | B2 | * | 6/2010 | Kim ....................... G02B 5/045 |
| | | | | 362/613 |
| 7,888,866 | B2 | * | 2/2011 | Maeda ................. H10K 50/858 |
| | | | | 313/506 |
| 8,619,363 | B1 | | 12/2013 | Coleman |
| 9,047,792 | B2 | * | 6/2015 | Chen .................... G02B 5/0242 |
| 2007/0196616 | A1 | | 8/2007 | Stalder et al. |
| 2015/0176977 | A1 | * | 6/2015 | Abele ................ G01B 11/2513 |
| | | | | 356/614 |
| 2016/0116647 | A1 | | 4/2016 | Masson et al. |
| 2022/0228722 | A1 | | 7/2022 | Nishikawa et al. |

FOREIGN PATENT DOCUMENTS

| | | |
|---|---|---|
| CN | 114995041 A | 9/2022 |
| CN | 114995042 A | 9/2022 |
| CN | 115167069 A | 10/2022 |
| JP | 2004133380 A | 4/2004 |
| JP | 2008506994 A | 3/2008 |

(Continued)

OTHER PUBLICATIONS

Korean Ministry of Intellectual Property, "including English translation of Notice to Submit Response for Korean Application No. 10-2023-0168674", dated Mar. 11, 2026, 9 pages.

*Primary Examiner* — Thong Q Nguyen

(74) *Attorney, Agent, or Firm* — Mannava & Kang, P.C.

(57) ABSTRACT

A diffuser including a substrate having a first surface and a second surface opposite the first surface; a reflective layer, and a refractive layer, in which the refractive layer has an index of refraction n>1 is disclosed. A system and a method of using the system are also disclosed.

19 Claims, 7 Drawing Sheets

(56) References Cited

FOREIGN PATENT DOCUMENTS

| | | | |
|---|---|---|---|
| JP | 2017534897 | A | 11/2017 |
| JP | 2021009354 | A | 1/2021 |
| KR | 10-2315504 | * | 10/2021 |
| WO | 2013-065172 | * | 10/2012 |

* cited by examiner

1

REFLECTIVE AND REFRACTIVE DIFFUSER

FIELD OF THE INVENTION

The present application is directed a diffuser including a substrate having a first surface and a second surface opposite the first surface; a reflective layer; and a refractive layer, in which the refractive layer has an index of refraction n>1. A system including the diffuser, and a method of using the system are also disclosed.

BACKGROUND OF THE INVENTION

Reflective diffusers are useful in a variety of applications, such as general illumination, solid-state lighting, displays, backlights, semiconductors. A single scattering surface is produced with a highly reflective material so that an incident beam is redirected upon reflection from the various microstructures that characterize the diffuser surface. A simple method to produce a reflective diffuser is to metalize the scattering surface although, to avoid absorption losses, more sophisticated dielectric coatings may be used as well. Reflective diffusers may also help make system layout more compact by allowing optical path folding.

What is needed is a diffuser that incorporates both reflection and refraction capabilities to provide an effective beam shaper that could achieve certain performance features that are often only attainable with multiple surfaces, when used in transmission mode.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figures 1A, 1B:
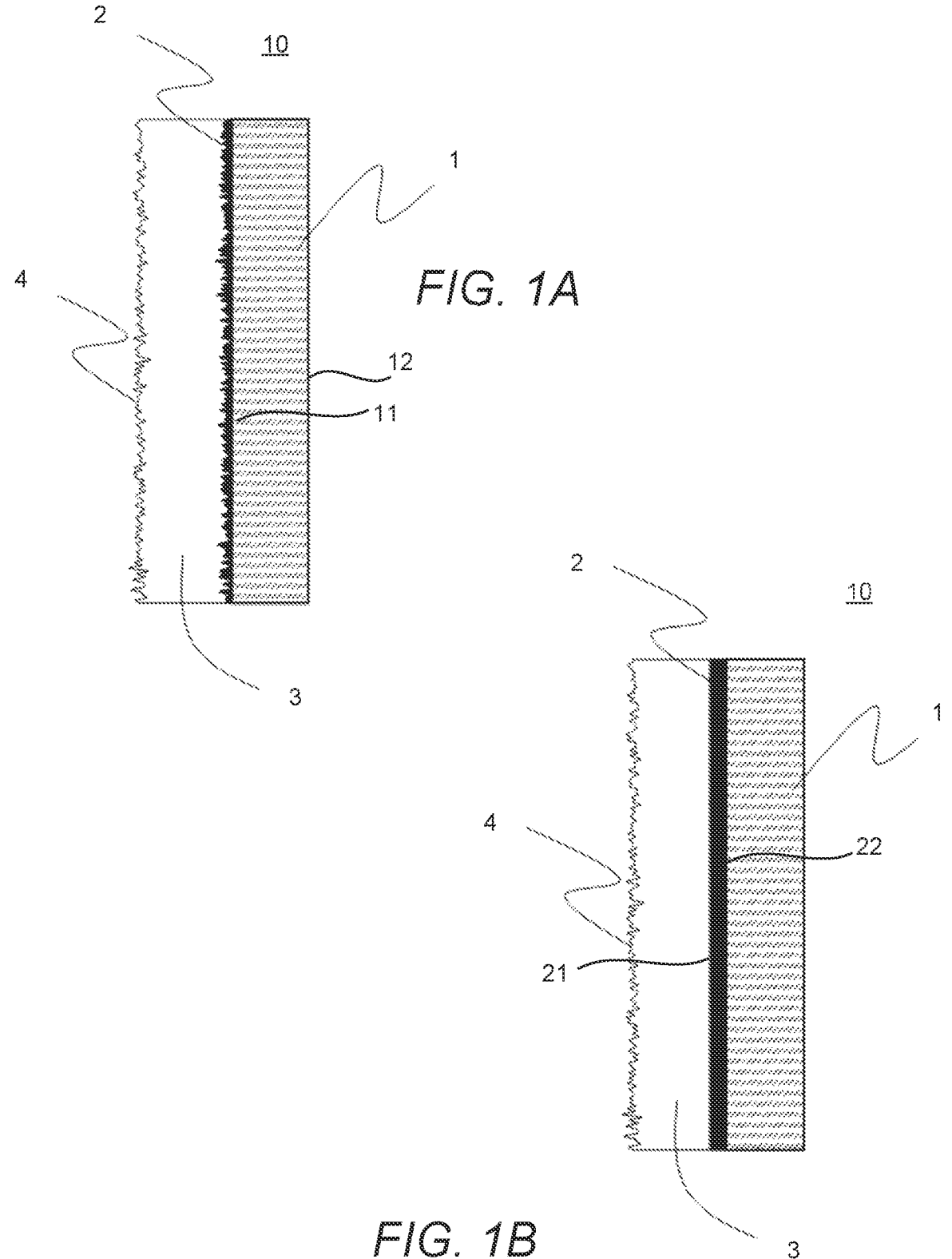
FIG. 1A illustrates a cross-section of a diffuser according to an aspect of the invention.
FIG. 1B illustrates a cross-section of a diffuser according to another aspect of the invention.

In an aspect, there is disclosed a diffuser including a substrate having a first surface and a second surface opposite the first surface; a reflective layer; and a refractive layer, in which the refractive layer has an index of refraction n>1.

In another aspect, there is disclosed a method of using a system, comprising: receiving illumination, from an illumination source, into a diffuser comprising a substrate having a first surface and a second surface opposite the first surface;

2 a reflective layer; and a refractive layer, wherein the refractive layer has an index of refraction n>1.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings.

In its broad and varied embodiments, disclosed herein is a diffuser 10 comprising: a substrate 1 having a first surface 11 and a second surface 12 opposite the first surface 11; a reflective layer 2; and a refractive layer 3, wherein the refractive layer 3 has an index of refraction n>1. In an aspect, the reflective layer 2 can be on the first surface 11 of the substrate 1, and the refractive layer 3 can be on a portion of the reflective layer 2, for example, as shown in FIGS. 1A-4. In another aspect, the reflective layer 2 can be on the second surface 12 of the substrate 1, and the refractive layer 3 can be on a portion of the substrate 1, as shown in FIGS. 5A-6. The diffuser 10 can be a catadioptric diffuser that incorporates a refractive surface that works in conjunction with a reflective surface, either as unpatterned or patterned, to shape an incoming illumination. The diffuser 10 can combine properties of transmissive and reflective microoptic surfaces allowing for multi-function capabilities in a single component.

Figures 1C, 2A:
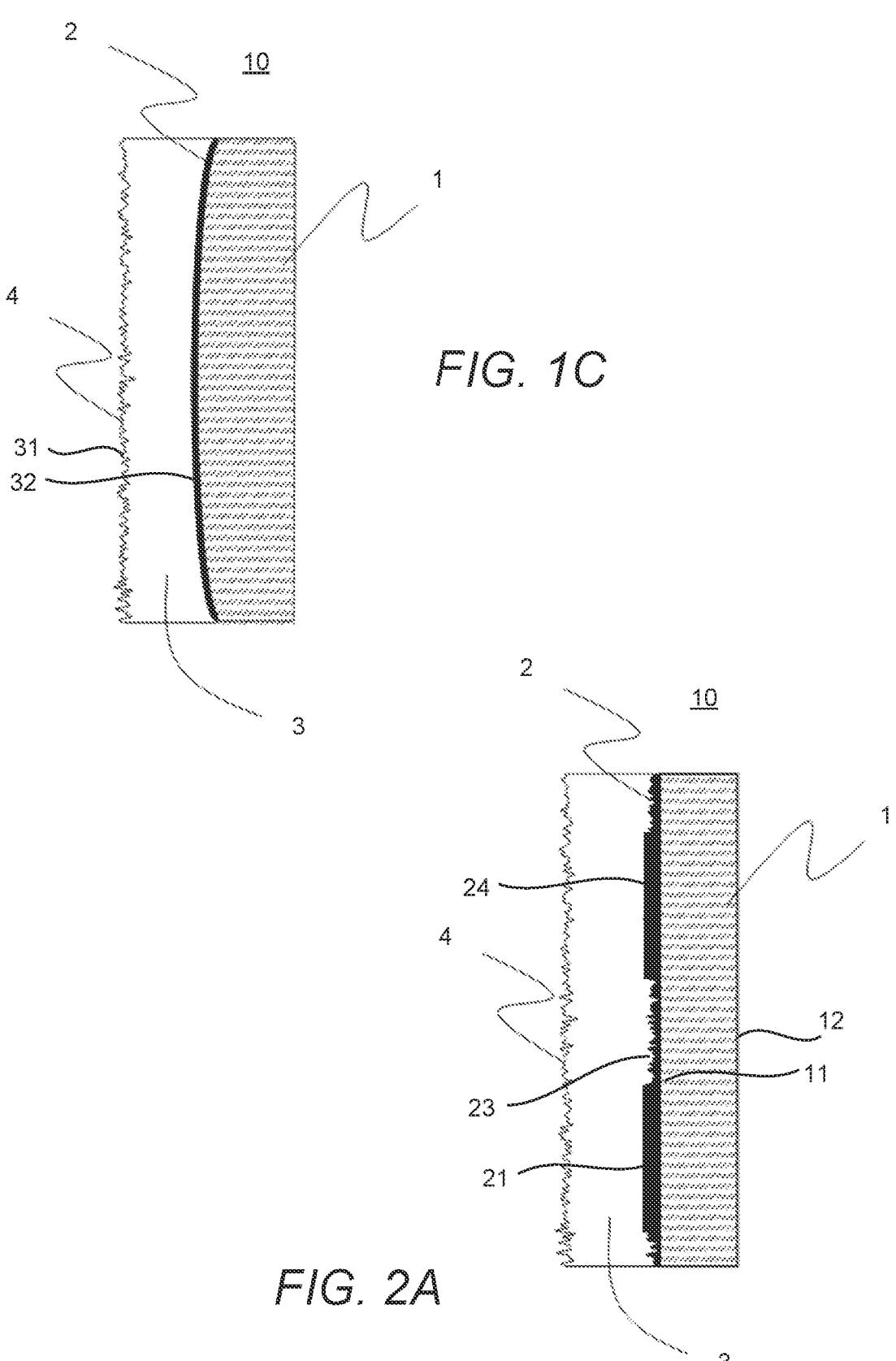
FIG. 1C illustrates a cross-section of a diffuser according to another aspect of the invention.
FIG. 2A illustrates a cross-section of a diffuser according to another aspect of the invention.

As shown in FIGS. 1A-1C, each of the substrate 1, reflective layer 2, and refractive layer 3 can have a first surface (11, 21, and 31, respectively) and a second surface (12, 22, and 32, respectively) opposite the first surface. In this manner, a first surface 11 of the substrate 1 can interface with the second surface 22 of the reflective layer 2, and the first surface 21 of the reflective layer 2 can interface with the second surface 32 of the refractive layer 3, as shown in FIGS. 1A-4. Alternatively, a second surface 12 of the substrate 1 can interface with the first surface 21 of the reflective layer 2, and the first surface 11 of the substrate 1 can interface with the second surface 32 of the refractive layer 3, as shown in FIGS. 5A-6. For positional reference, the first surface (11, 21, and 31, respectively) is positioned towards an illumination source 50, and the second surface (12, 22, and 32, respectively) is positioned away from an illumination source.

A substrate 1 can have a first surface 11 and a second surface 12 opposite the first surface 11. The substrate 1 can provide support for the diffuser 10. The substrate 1 can be produced in custom dimensions or machines (diced, cored, etc.) from a larger article, such as a larger wafer, glass sheet, glass wafer, or plastic film. In an aspect, the substrate 1 can include generally inorganic materials (e.g., a fused silica, a silicon, a germanium, and the like), as monolithic substrates. In another aspect, the substrate 1 can be inorganic films coated on a substrate, such as $Ta_2O_5$ deposited on a glass substrate. The substrate 1 can be transparent, and can include a transparent material such as glass or plastic to allow a portion of incident illumination to be transmitted unimpeded. In another aspect, the substrate 1 can be opaque.

In the diffuser 10, in an aspect, a reflective layer 2 can be present on the first surface 11 of the substrate 1, as shown in FIGS. 1A-4. In another aspect, a reflective layer 2 can be present on the second surface 12 of the substrate 1, as shown in FIGS. 5A-6. The reflective layer 2 can be formed of highly reflective materials and can include any materials that have reflective characteristics in the desired spectral range. For example, any material with a reflectance ranging from 50% to 100% in the desired spectral range. An example of a reflective material can be aluminum, which has good reflectance characteristics, is inexpensive, and easy to form into or deposit as a thin layer. Other materials can also be used in place of aluminum. For example, copper, silver, gold, platinum, palladium, nickel, cobalt, niobium, chromium, tin, and combinations, blends or alloys of these or other metals can be used as reflective materials. In an aspect, the reflective material can be a white or light colored metal. In other examples, the reflective material can include, but is not limited to, the transition and lanthanide metals and combinations thereof; as well as metal carbides, metal oxides, metal nitrides, metal sulfides, a combination thereof, or mixtures of metals and one or more of these materials.

A reflective material can reflect light in multiple spectral ranges, such as visible light (from about 380 nm to about 800 nm), ultraviolet light (from about 200 nm to about 400 nm), and infrared light (from about 800 nm to about 1 mm). The infrared wavelength range can include near infrared, shortwave infrared, medium wave infrared, and long wave infrared.

The reflective layer 2 can have a first surface 21 including a plurality of light scattering features that can form a diffuser pattern, as shown in FIG. 1A. As shown in FIG. 5A, the reflective layer 2 can have a second surface 22 including a plurality of light scattering features that can form a diffuser pattern. The light scattering features can spread incident illumination in space. The plurality of light scattering features can be at least one of microstructures, a grating, an array of microlenses, or the like. As shown in FIGS. 1A and 5A, the plurality of light scattering features can be present along an entire length of the first surface 21 or second surface 22, respectively. The plurality of light scattering features can be present along one or more portions of the length of the first surface 21 or second surface 22. For example, as shown in FIG. 2A, a first portion 23 of the reflective layer 2 can include a plurality of light scattering features, and can be devoid of light scattering features along a second portion 24 of the reflective layer 2.

A first surface 21, and optionally, a second surface 22 of the reflective layer 2 can be planar, such as, along a portion or an entire length of the reflective layer 2. In FIG. 1A, the first surface 21 includes a plurality of light scattering features along an entire length, and the second surface 22 is planar, i.e., is flat and/or smooth. In FIG. 5A, the first surface 21 is planar, i.e., is flat and/or smooth, and the second surface 22 includes a plurality of light scattering features along an entire length. In FIGS. 1B and 5B, both the first surface 21 and the second surface 22 of the reflective layer 2 are planar.

Figures 5A, 5B:
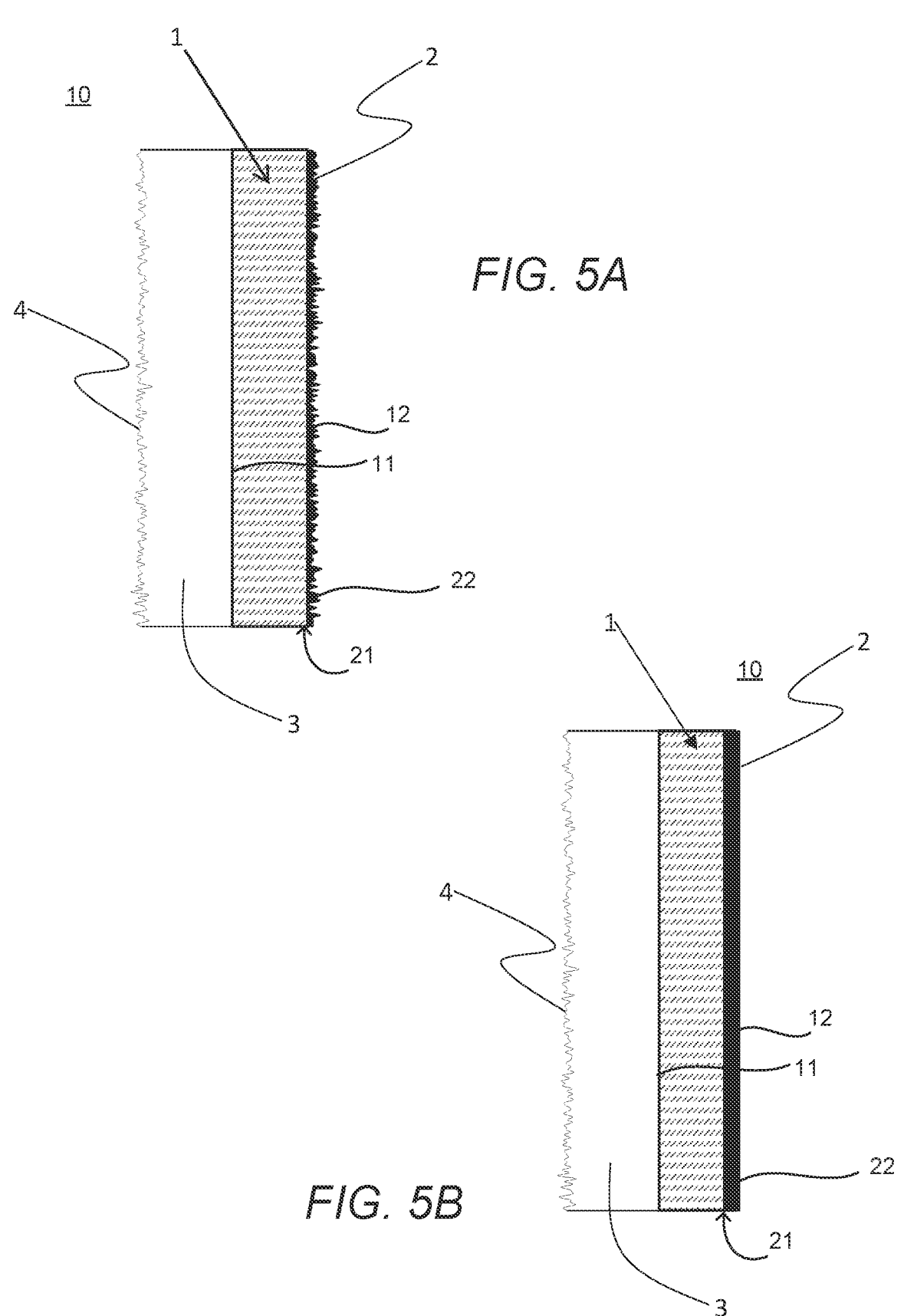
FIGS. 5A-5C illustrate a cross-section of a diffuser according to another aspect of the invention.
Figure 5C:
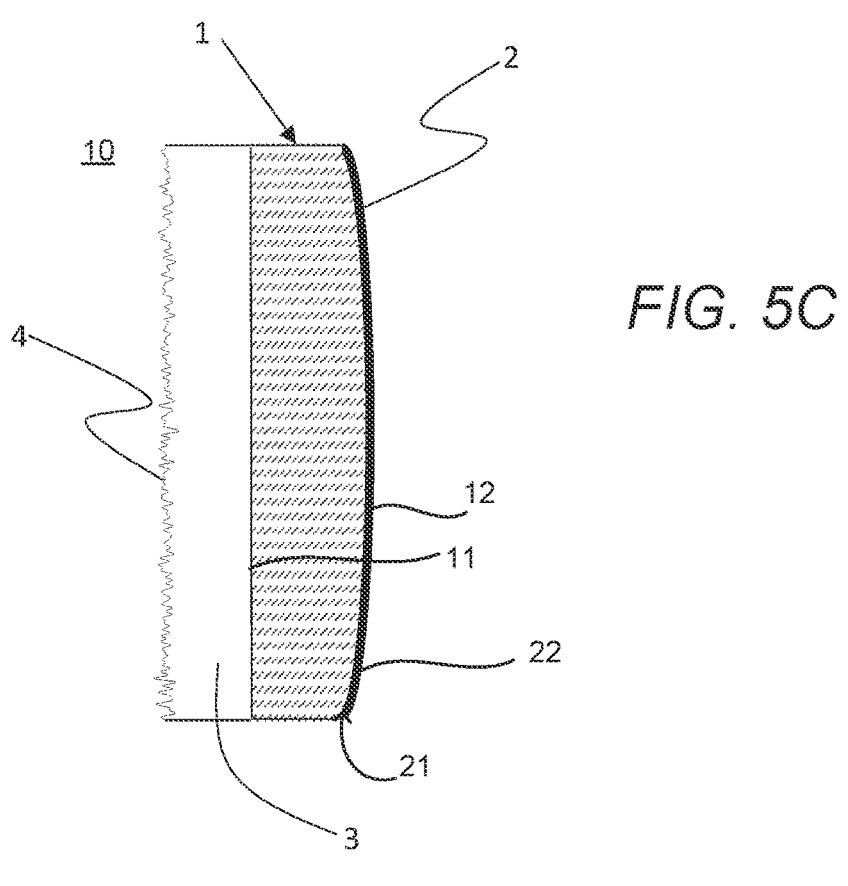
Figure 6:
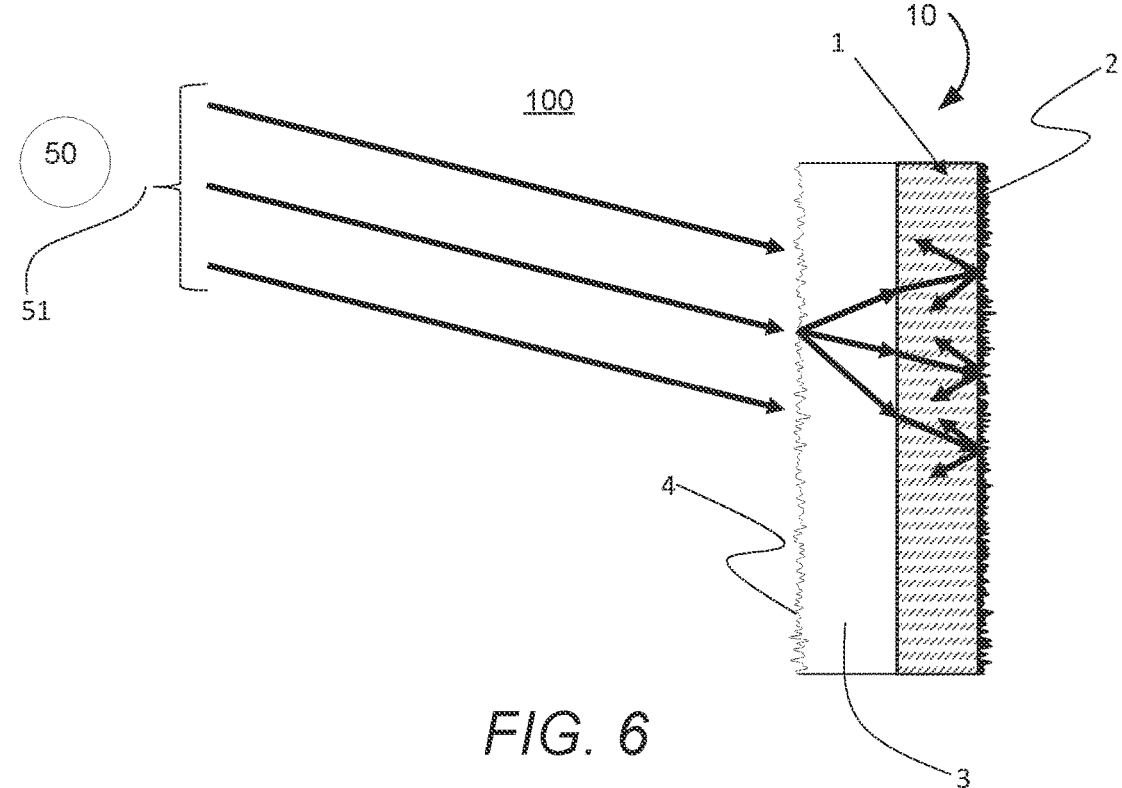
FIG. 6 illustrates a system including a cross-section of a diffuser according to another aspect of the invention.

As shown in FIGS. 1C and 5C, the first and second surfaces 21, 22 of the reflective layer 2 can be curved, such as concave, convex, or a combination of both. For example, a first portion of the reflective layer 2 can be concave, and a second portion of the reflective layer 2 can be convex. The reflective layer 2 can be curved over a portion of the substrate 1.

Figures 2B, 2C:
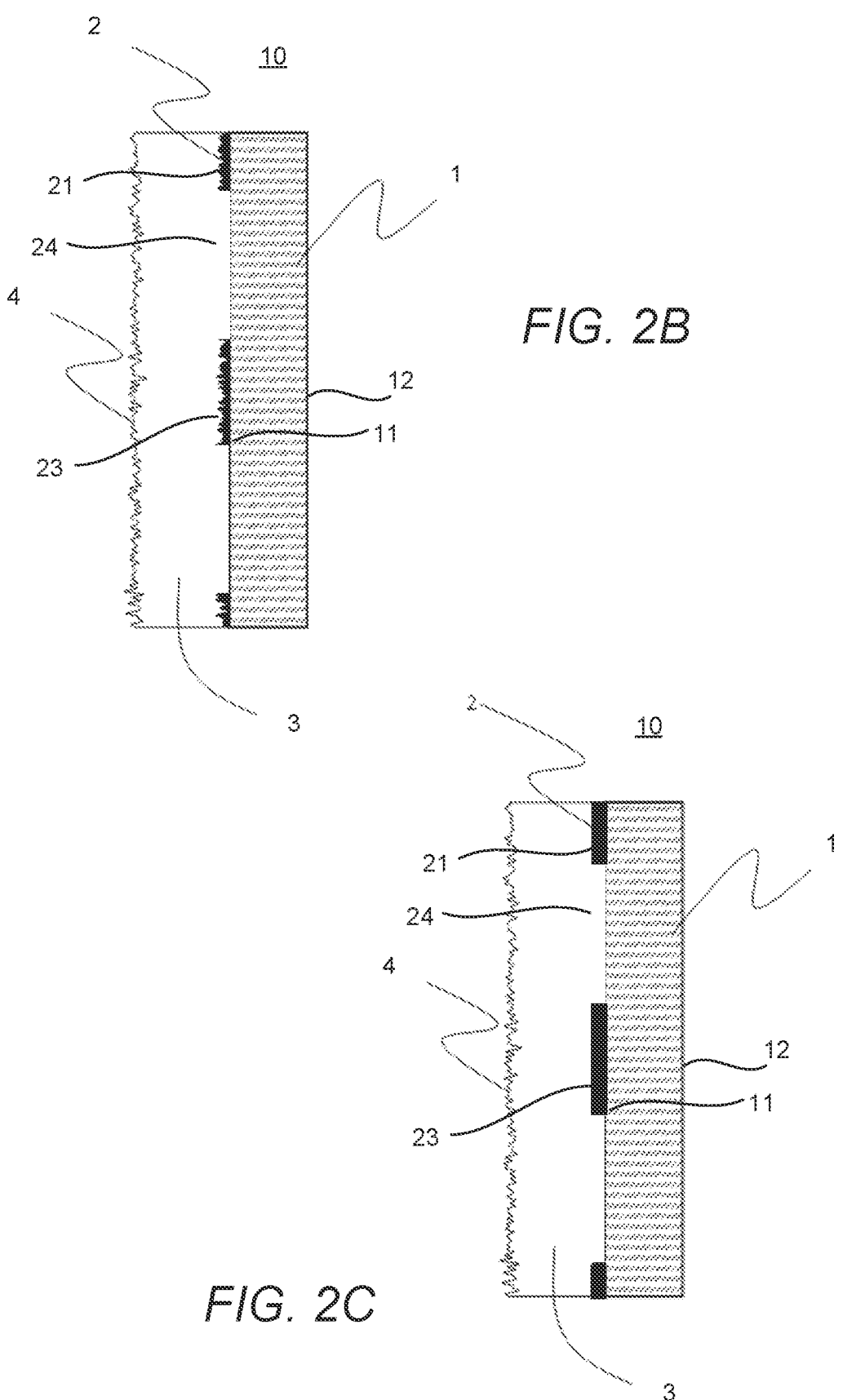
FIG. 2B illustrates a cross-section of a diffuser according to another aspect of the invention.
FIG. 2C illustrates a cross-section of a diffuser according to another aspect of the invention.
Figure 3:
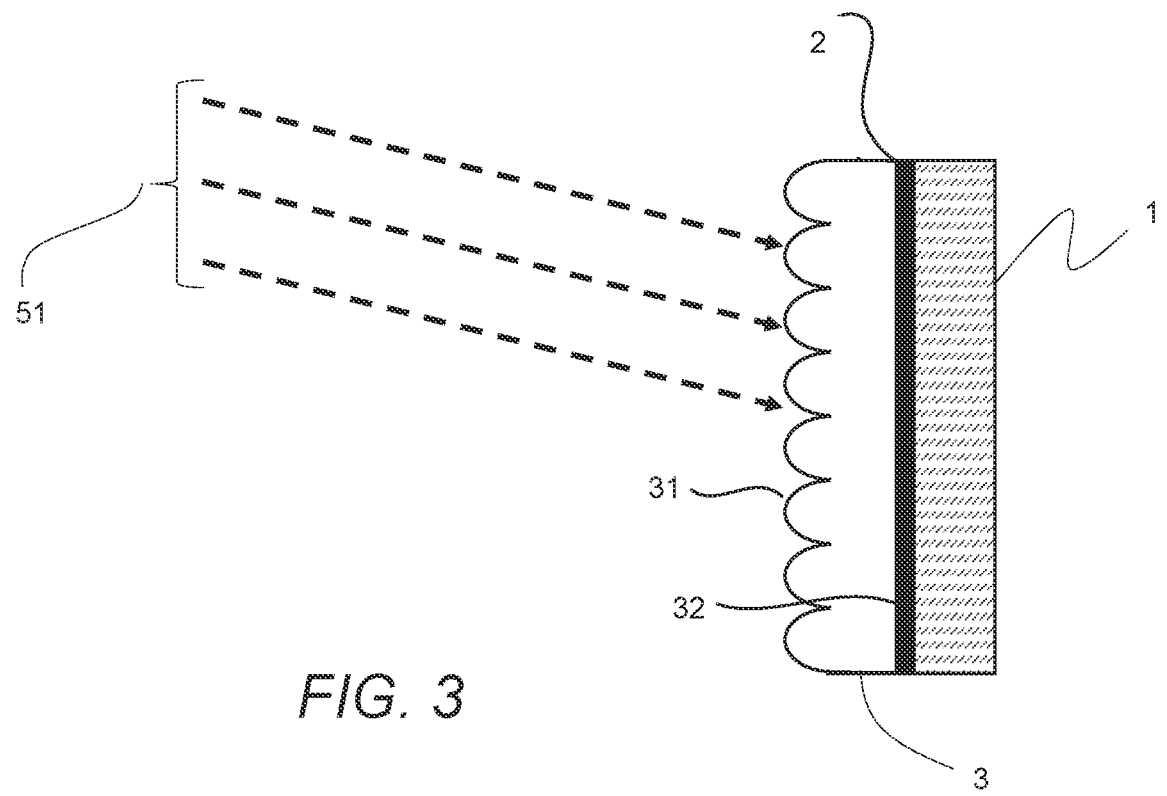
FIG. 3 illustrates a cross-section of a diffuser according to another aspect of the invention.

In an aspect, the reflective layer 2 can extend along an entire length of the substrate 1, or can extend along a portion of the length of the substrate 1. For example, as shown in FIG. 2B, the reflective layer 2 can be present in two or more portions (first portion 23 and second portion 24) along a length of the substrate 1, and wherein each portion (e.g., first portion 23) of reflective layer 2 is separated by a void (e.g., second portion 24) of reflective material. As shown in FIG. 2C, the reflective layer 2 includes two or more first portions 23 including planar reflective material separated by two or more second portions 24 including void areas of reflective material to form a diffraction grating.

The first surface 21 and/or the second surface 22 of the reflective layer 2 can be devoid of a diffuser pattern. In another aspect, the first surface 21 and/or the second surface 22 of the reflective layer 2 can include or form a diffuser pattern.

The reflective layer 2 can include one or more of a plurality of light scattering features, a planar surface, and a curved surface along one or more portions of the reflective layer 2, and can optionally include one or more portions with voids of plurality of light scattering features, and reflective material. In an aspect, the first surface 21 of the reflective layer 2 can include a surface profile chosen from a periodic microstructure, a random microstructure, symmetric, asymmetric, one-dimensional, and two-dimensional.

The diffuser 10 also includes a refractive layer 3 that can be present on at least a portion the reflective layer 2, wherein the refractive layer 3 has an index of refraction n>1. The refractive layer 3 can be formed of any material having an index of refraction n>1. The refractive layer 3 can have a degree of transparency to input illumination.

In an aspect, the refractive layer 3 can encapsulate and/or extend along an entire length of the reflective layer 2. As discussed above, the refractive layer 3 can have a first surface 31; and a second surface 32, opposite the first surface 31, which interfaces with the reflective layer 2. As shown in FIGS. 1A and 1B, the second surface 32 of the refractive layer 3 can interface with the first surface 21 of the reflective layer 2, wherein the second surface 32 of the refractive layer 3 is planar. As shown in FIG. 1C, the second surface 32 of the refractive layer 3 is curved, such as concave, convex, or combinations thereof. The first surface 31 can include a diffuser pattern 4. The refractive diffuser pattern 4 can be a same or different pattern from a reflective layer diffuser pattern.

The first surface 31 of the refractive layer 3 can be planar, curved (concave, convex), or combinations thereof, such as along an entire length of the first surface 31, or in different portions along the length. The first surface 31 can include a grating pattern.

In another aspect, in portions of the diffuser 10 that are void of reflective material, the refractive layer 3 can be present on one or more portions of the substrate 1, as shown in FIGS. 2B and 2C. For example, a first portion of the refractive layer 3 can extend along the entire reflective layer 2, and wherein a second portion of refractive layer 3 can extend along a portion of the substrate 1. In an aspect, the refractive layer 3 can be present on a portion of the reflective layer 2.

Additionally, the refractive layer 3 can be present on a first surface 11 of the substrate 1, for example, when the reflective layer 2 is present on a second surface 12 of the substrate 1, as shown in FIGS. 5A-6.

In an aspect, the first surface 31 of the refractive layer 3 can include a grating, a microlens array, or a periodic structure. The first surface 31 can be illuminated by input beam 51, for example, from a light source 50. The first surface 31 can include a surface profile chosen from general, symmetric, asymmetric, one-dimensional, and two-dimensional. The first surface 31 can be planar or curved.

Figure 4:
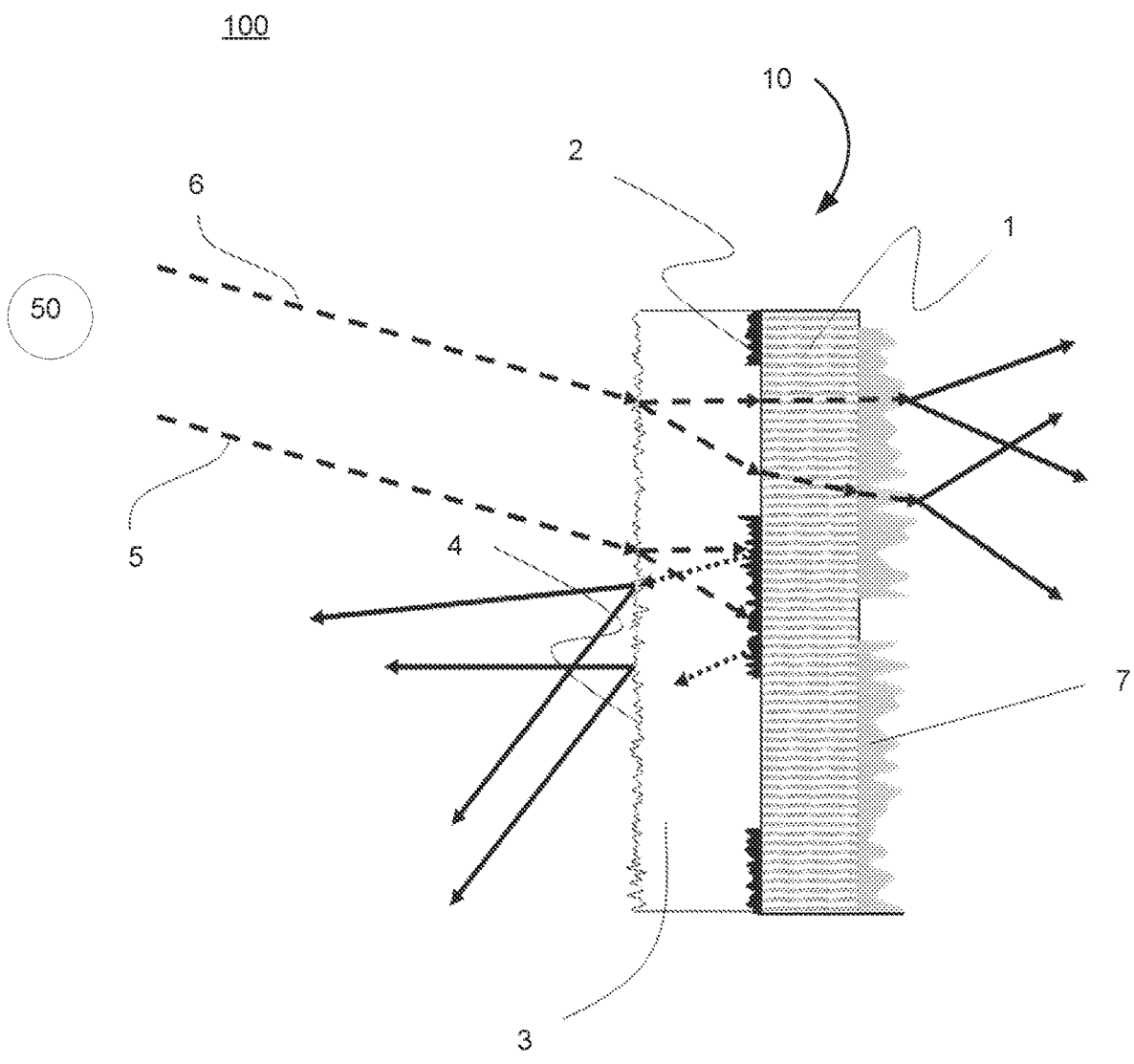
FIG. 4 illustrates a system including a cross-section of a diffuser according to another aspect of the invention.

FIG. 4 illustrates a system 100 including an illumination source 50, and a diffuser 10. The diffuser 10 has been described above. Additionally, the diffuser 10 can include a substrate 1 with a second surface 12 including a patterned optical material 7. The patterned optical material 7 can extend along an entire length of the second surface 12 of the substrate 1. In an aspect, the patterned optical material 7 can be present in a first portion and can be void in a second portion. The optical material 7 can be formed from polymeric materials that can be replicated onto substrate 1, such as free-radical cure acrylates, cationic cure epoxies, UV cross-linkable polymers, and heat cross-linkable polymers. Alternatively, optical material 7 can be monolithically part of the substrate 1 itself, and can be produced via processes such as reactive-ion etching (in the case of hard materials, such as a fused silica, silicon, and germanium) or direct molding (in the case of glass molding or plastic molding via injection-molding or embossing processes).

FIG. 6 illustrates a system 100 including an illumination source 50, and a diffuser 10. The diffuser 10 has been described above. The illumination source 50 can emit an input beam 51 that can be received by a pattern 4 of the first surface 31 of the refractive layer 3. The received input beam 51 can be transmitted through the refractive layer 3 and the substrate 1 into the reflective layer 2 on the second surface 12 of the substrate 1. The transmitted input beam 51 can be reflected by the plurality of light scattering centers on the second surface 22 of the reflective layer 2 into the diffuser 10.

The system 100 can be used in a method including receiving illumination, from an illumination source 50, into a diffuser 10 comprising a substrate 1 having a first surface 11 and a second surface 12 opposite the first surface 11; a reflective layer 2 on the first surface 11; and a refractive layer 3 on a portion of the reflective layer 2, wherein the refractive layer 3 has an index of refraction n>1. A portion of the illumination from the light source can be transmitted by the refractive layer 3 to the reflective layer 2; and wherein the transmitted illumination is reflected by the reflective layer 2 back through the refractive layer 3, such as along ray 5 of FIG. 4. A portion of the illumination is transmitted by the refractive layer 3 toward the substrate 1 and is unimpeded through the diffuser 10, such as along ray 6 of FIG. 4.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed:

1. A diffuser comprising:
a substrate having a first surface and a second surface opposite the first surface;
a reflective layer; and
a refractive layer including a first surface and a second surface opposite the first surface, the second surface of the refractive layer interfacing with the reflective layer and the first surface of the refractive layer including a diffuser pattern, wherein the refractive layer has an index of refraction n>1,
wherein the refractive layer diffuser pattern is a grating,
wherein a first portion of the refractive layer extends along all the reflective layer, and
wherein a second portion of the refractive layer extends along a portion of the substrate.

2. The diffuser of claim 1, wherein the reflective layer includes a plurality of light scattering features.

3. The diffuser of claim 2, wherein the plurality of light scattering features is chosen from microstructures, a grating, and an array of microlenses.

4. The diffuser of claim 1, wherein the reflective layer is planar.

5. The diffuser of claim 1, wherein the reflective layer is curved.

6. The diffuser of claim 1, wherein a second surface of the refractive layer interfaces with a first surface of the reflective layer, wherein the second surface of the refractive layer is planar or curved.

7. The diffuser of claim 1, wherein the reflective layer includes a diffuser pattern; and the refractive layer diffuser pattern is different from the reflective layer diffuser pattern.

8. The diffuser of claim 1, wherein the second surface of the substrate includes a patterned optical material.

9. A system comprising:
an illumination source; and
the diffuser of claim 1.

10. A diffuser comprising:
a substrate having a first surface and a second surface opposite the first surface;
a reflective layer; and
a refractive layer including a first surface and a second surface opposite the first surface, the second surface of the refractive layer interfacing with the reflective layer and the first surface of the refractive layer including a diffuser pattern, wherein the refractive layer has an index of refraction n>1,
wherein either i) the reflective layer is present in two or more portions along a length of the substrate, and wherein each portion of reflective layer is separated by a void of reflective material, or ii) a first portion of the reflective layer includes a plurality of light scattering features, and a second portion of the reflective layer is devoid of light scattering features.

11. The diffuser of claim 10, wherein the reflective layer includes a plurality of light scattering features.

12. The diffuser of claim 11, wherein the plurality of light scattering features is chosen from microstructures, a grating, and an array of microlenses.

13. The diffuser of claim 10, wherein the reflective layer includes a diffuser pattern; and the refractive layer diffuser pattern is different from the reflective layer diffuser pattern.

14. The diffuser of claim 10, wherein the second surface of the substrate includes a patterned optical material.

15. The diffuser of claim 10, wherein the second surface of the refractive layer is planar or curved.

16. A system comprising:
an illumination source; and
the diffuser of claim 10.

17. A method of using a system, comprising:
receiving illumination, from an illumination source, into a diffuser comprising a substrate having a first surface and a second surface opposite the first surface;

a reflective layer; and
a refractive layer including a first surface and a second surface opposite the first surface, the second surface of the refractive layer interfacing with the reflective layer and the first surface of the refractive layer including a diffuser pattern, wherein the refractive layer has an index of refraction n>1,
wherein the refractive layer diffuser pattern is a grating,
wherein a first portion of the refractive layer extends along all the reflective layer, and
wherein a second portion of the refractive layer extends along a portion of the substrate.

18. The method of claim 17, wherein a portion of the illumination is transmitted by the refractive layer to the reflective layer; and wherein the transmitted illumination is reflected by the reflective layer back through the refractive layer.

19. The method of claim 17, wherein a portion of the illumination is transmitted by the refractive layer toward the substrate and is unimpeded through the diffuser.

* * * * *